UNITED STATES PATENT OFFICE 2,671,774

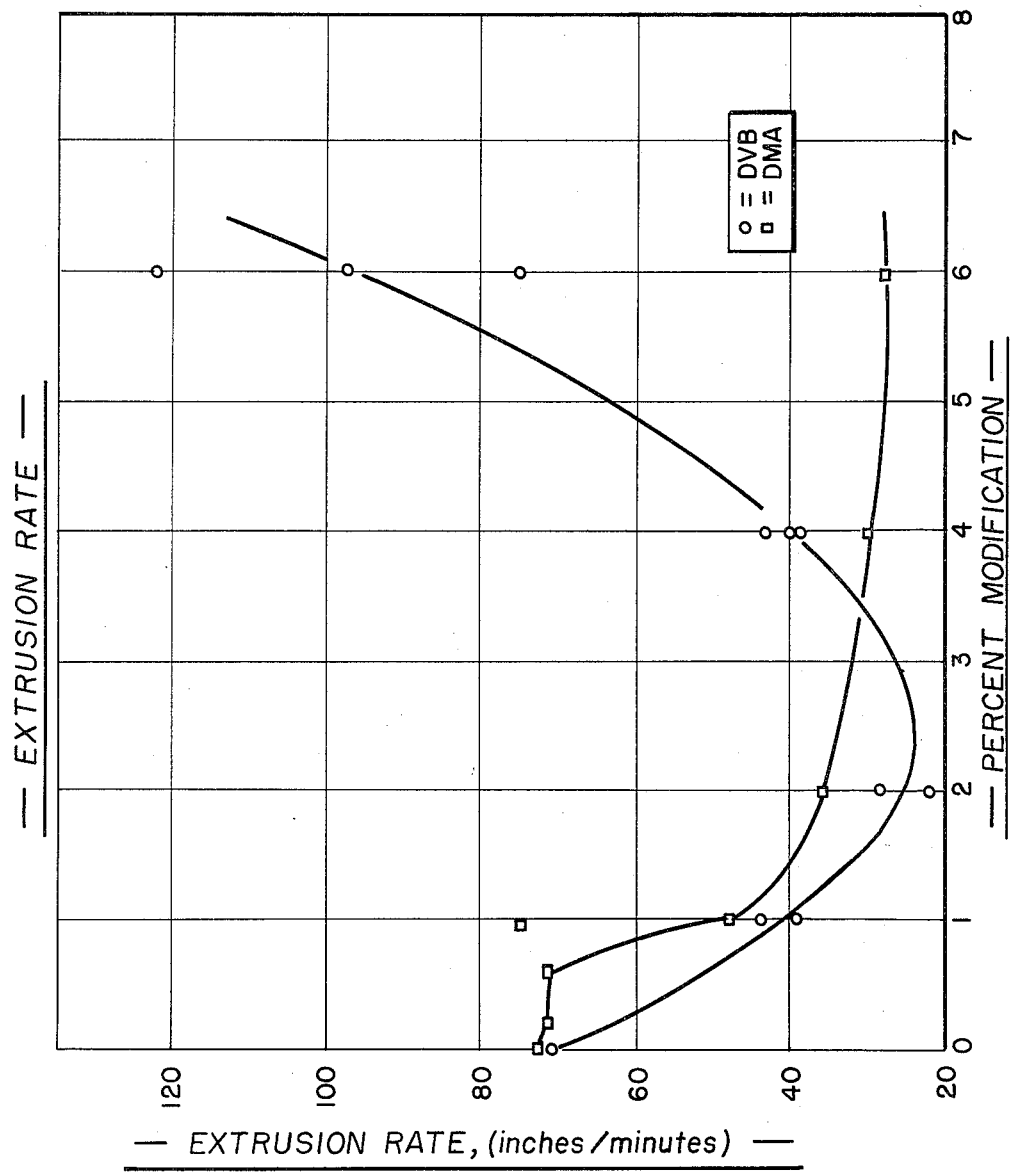

HIGH EXTRUSION MODIFIED ISOOLEFIN-MULTIOLEFIN COPOLYMERS

Edward A. McCracken and Allen L. Chaney, Baton Rouge, La., assignors to Standard Oil Development Company, a corporation of Delaware Application July 28, 1952, Serial No. 301,326

13 Claims. (Cl. 260—80.7)

This invention relates to improved rubbery polymers and particularly to vulcanizable interpolymers which are insoluble in oil and contain relatively large amounts of gel but retain their good extrusion characteristics. The invention relates particularly to modified interpolymers containing more than 4% and up to a maximum of about 10% of cross-linking agent selected from divinyl aromatic hydrocarbon compounds, particularly divinyl benzene.

It has heretofore been found possible to prepare valuable copolymers by polymerizing mixtures of an isoolefin such as, specifically, isobutylene, with conjugated diolefins, for example, butadiene, isoprene, piperylene and dimethyl butadiene and the methyl pentadienes. The presence of the diolefin permits the preparation of a copolymer in which the chemical unsaturation is high enough to permit vulcanization. The copolymers are prepared by a low temperature polymerization using a diluent-refrigerant and a dissolved Friedel-Crafts type catalyst as, for example, aluminum chloride dissolved in an alkyl halide solvent. The resulting interpolymers are elastic, rubbery-like substances having an iodine number within the range between about 1 up to about 50, and are reactive with sulfur particularly in the presence of a sulfurization aid.

The present invention provides for an entirely new kind of oil-insoluble, high gel-content interpolymer. These interpolymers are prepared by carrying out polymerization of a mixture of an isoolefin, a conjugated diolefin, and an amount of divinyl aromatic compound of more than 4% up to a maximum of about 10%. The preferred divinyl aromatic hydrocarbon for use in the modified polymers is divinyl benzene. The resulting interpolymers are elastic, vulcanizable substances. The physical characteristics of the modified polymers resemble those of the copolymers of isoolefins and conjugated diolefins. It has been noted, however, that the modulus values increase upon the addition of greater amounts of divinyl benzene. The copolymers prepared by the present invention are substantially insoluble in organic solvents and contain more than 80% of gel. The tendency toward cold flow is greatly reduced both in raw and compounded polymer. This property makes the polymers of particular use in certain specialized applications where low cold flow is desirable. Nerve or elasticity in forming operations such as extrusion or calendering is greatly reduced and therefore would make the polymer especially suitable in such applications as floor tile and rubber tires. The polymers are also quite useful in blends such as in conjunction with isoolefin-multiolefin copolymers.

This application is a continuation-in-part of patent application Serial No. 258,744, filed November 28, 1951.

The well known rubbery interpolymers of iso-monoolefins, such as isobutylene, and conjugated diolefins, such as isoprene and butadiene, are marketed commercially under the trade-name "Butyl Rubber" and also under the Government designation: GR–I. This synthetic rubbery material has a sufficient number of physical properties of natural rubber such that it is excellent for certain uses. Polymers of the isoolefin-diolefin type have been found to be particularly suitable for automobile inner tubes because of the resistance of the material to the diffusion of air and other gases when under pressure in which respect they are superior to natural rubber. However, in the manufacture of inner tubes and other types of rubber materials, difficulties have been encountered in the processing steps. In general, the isoolefin-diolefin copolymers extrude and show only moderate swell at the extruder die. After extrusion, the physical properties of the copolymer, namely, the "cold flow" of the rubbery material causes the extruded object to lose its shape if it is allowed to stand for a few hours at room temperature before a final curing. Consequently, the forming steps must necessarily be carried out rapidly and completed without a pause until the article is cured. This requirement is a disadvantage in large scale plant practice and causes a considerable number of rejections of extruded objects due to mechanical failure or deformation of the copolymer compound. The flow of the rubber in the packages and of chunks lying on shelves, etc. is also a very objectionable problem around factories.

According to the present invention, if the polymerization of the iso-monoolefin and the conjugated diolefin is carried out in the presence of specified amounts of more than 4% by weight and up to a maximum of about 10% of a cross-linking agent of the divinyl aromatic hydrocarbon type, such as divinyl benzene, new polymer products are produced which have unexpected and improved physical properties which are particularly apparent before vulcanization.

To carry out the process of the present invention there is prepared a mixture of the iso-monoolefin, having 4 to 5 carbon atoms, preferably isobutylene in major proportion, a diolefin containing at least two conjugated ethylenic linkages and having from 4 to 8 carbon atoms per molecule in minor proportion, such substances including butadiene, isoprene, piperylene, and dimethyl butadiene, and more than 4% up to a maximum of 10% by weight of the isobutylene of a divinyl modifying agent such as divinyl benzene. The resulting mixture of olefins and diolefins is polymerized at a temperature below 0° C. within the range from 0° C. to −164° C. This polymerization is carried out by application to the cold olefin mixture of a Friedel-Crafts catalyst in solution to produce the desired copolymer. The copolymer is recovered from the polymerization reactor by dumping the mixture into water to hydrolyze and remove the residual catalyst, and to drive out the dissolved and adsorbed monomer present from the original reaction mixture. The polymer after drying can then be compounded with appropriate amounts of zinc oxide, carbon black, stearic acid, and other additives, if desired, and a curing agent or agents which may be sulfur and a sulfurization aid, or a nonsulfur curing agent such as p-quinone dioxime, or dinitroso benzene, or their analogues, homologues and/or equivalents. The resulting compounded polymer is then extruded into the desired shape, for instance, a tubular shape, which is put through the subsequent forming, splicing and valve pad applying operations and is then cured under pressure in an appropriate mold in order to yield the desired finished article, particularly an inner tube. The polymer may be otherwise fabricated as desired.

One raw material is the preferred iso-monoolefin, isobutylene, which is preferably of a purity of at least 96 to 99.5%. Another raw material is a multiolefin containing at least two carbon-to-carbon double linkages, and the preferred substance is a conjugated diolefin such as isoprene or butadiene, but other multiolefins having from 4 to 8, inclusive, carbon atoms can be used. The isobutylene and the conjugated diolefin are mixed together in a proportion which depends somewhat upon the characteristics of the multiolefin. For instance, with butadiene, the reaction mixture which is to be polymerized may contain from 70 to 90 parts of isobutylene with from 30 to 10 parts of butadiene, with isoprene, the preferred range is from 95 to 99.5 parts of isobutylene with from 5 to 0.5 parts of isoprene. It is to be noted that most of the multiolefins copolymerize into the finished copolymer in a proportion approaching that in which they are present in the initial reaction mixture except butadiene. In polymerizing butadiene and isobutylene together, approximately 20% of butadiene present in the mixture causes the copolymerization of only about 1% of the butadiene into the copolymer, and accordingly, there is a change in relative concentrations of butadiene and isobutylene as the batch reaction proceeds. Most of the unsaturates show different polymerization ratios.

For the cross-linking material, that is, the third reactant, the preferred substance is one of the divinyl aromatic hydrocarbons. Divinyl benzene has been found to be of particular use. The para, the ortho and the meta compounds are all usable or mixtures of any two or all three of these. The analogous naphthyl compounds appear to be similarly usable as are the divinyl toluenes and divinyl xylenes. Diisopropenyl benzene is also useful. In using these modifying or cross-linking substances, it is of importance to control the percentage employed within the limits of above 4% and up to 10% based on the amount of isobutylene used. The use of larger amounts of the cross-linking material with the resultant reduction in the amount of the other reactants substantially changes the entire character of the polymer produced. At concentrations of 8% divinyl benzene and above, polymers tend to be resinous and therefore are not suitable for uses as rubbery polymers. Polymers of above 10% divinyl benzene content probably do not belong in the class claimed, however, they may be of interest in other uses. On the other hand, the use of 4% and less of the modifying agent yields products which are of a different kind than those herein contemplated. The relationship between the concentration of divinyl benzene used in accordance with this invention and similar concentrations of dimethallyl and other well-known cross-linking agent is shown in the accompanying figure. This figure shows the extrusion rate in inches per minute of the modified polymers as the per cent of cross-linking agent is increased. The unique properties obtained by the use of the herein defined divinyl benzene concentration limits are clearly shown. While the extrusion rate of polymers modified with about 4% of divinyl benzene and dimethallyl are undesirably low and substantially the same, as the percentage of modifying agent is increased the extrusion rate of the polymer containing divinyl benzene rapidly increases with increase in concentration, but the polymers containing dimethallyl all have uniformly low extrusion rates. This difference is of very great importance since the extrusion rate of the dimethallyl modified polymer is so low under these conditions as to prohibit its use in a practical way for making extruded articles. On the other hand, the divinyl benzene polymers of this invention have high extrusion rates and can be conveniently fabricated by well-known commercial methods. At the same time that the extrusion rate increases, the extrusion swell decreases, thereby making it possible to extrude to nearly die dimensions. This unexpected difference between the two otherwise closely related modifying agents is not completely understood and could not be predicted from data previously known. It is believed, however, that some form of an "inner plasticization" is taking place in the copolymers containing the divinyl benzene.

These modified copolymers contain greater than 80% of oil insoluble gel and are generally tough, plastic materials. Otherwise, they possess substantially the same high qualities of the unmodified isoolefin-conjugated diolefin copolymers.

The polymerization reaction can be conducted batchwise or in a continuous operation in which continuous streams of cold catalyst and cold unsaturate with a diluent are delivered to the reactor and an overflow of a slurry or solution of polymer is taken out for the recovery of the polymer.

The polymerization reaction is conducted within a temperature range between 0° C. and −164° C., preferably within the range between −40° C. or −50° C. and −110° C. The reduced temperature may be obtained by the direct admixture to the reactant olefins of a refrigerant-diluent such as liquid propane, solid carbon dioxide, liquid ethane or liquid ethylene. For an internal refrigerant it is essential that the refrigerant be free from any tendency to copolymerize and free from any tendency to react with the catalyst. Alternatively, the reduced temperature may be obtained by an external refrigerating jacket upon the reaction vessel. Any convenient refrigerant may be used in the reactor jacket including carbon dioxide, propane, ethane, and ethylene and the like.

In carrying out the polymerization reactions employing cross-linking agents, it is preferred to conduct the reaction in the presence of at least 1 up to 10 volumes of a diluent which may be a refrigerant-diluent or may be a simple diluent such as ethyl or methyl chloride, or methylene or ethylene dichloride, or chloroform, or ethylene trichloride, or a mixed diluent containing a hydrocarbon such as propane, butane or the like. In any event, it is preferred to employ a reaction diluent containing more than 50% by volume of an alkyl halide having from 1 to 2 carbon atoms, the preferred halogenated diluents being methyl chloride or ethyl chloride. The principal requirements for the diluent are that it shall be liquid at the reaction temperature, that it shall not be reactive with the catalyst and that it shall be sufficiently stable under the reaction conditions to avoid the production of break-down products. Various of the chloro-fluoro hydrocarbons as well as fluoro hydrocarbons or other inert diluents which are quite soluble in the reaction mixture can be used.

The polymerization catalyst employed is a Friedel-Crafts active metal halide catalyst substance in solution in a low-freezing, non-complex-forming solvent. Aluminum chloride is usually the preferred catalytic substance with aluminum bromide and titanium tetrachloride just about as satisfactory. Boron trifluoride in solution is satisfactorily usable with some of the diolefins. For the catalyst solvent, it is only necessary that the solvent have a freezing point below 0° C., although it is usually convenient to use a catalyst solvent having a freezing point below the polymerization temperature. These requirements are met by any solvent which is low freezing, that is, having a freezing point below the freezing point of water. The preferred catalyst solvent with aluminum chloride are ethyl and methyl chloride or methylene or ethylene dichloride, or chloroform, or occasionally, propyl chloride or the like. With aluminum bromide or boron trifluoride as catalyst, the same solvents are advantageously usable and, in addition, the low-freezing hydrocarbons such as liquid ethane, liquid butane, liquid heptane, liquid hexane and the like are also usable.

The production of soluble or insoluble polymers containing more or less bi-functional agents or cross-linking agents, such as divinyl benzene, is considerably influenced by certain other factors. One important factor other than the amount of the cross-linking agent present is the average chain length of the polymer produced. This chain length can be affected by changing the ratio of diluent. For instance, if there are 10 parts of diluent per part of isobutylene reactant, the chain length will be substantially shorter than if 2 parts of diluent per part of isobutylene reactant are used. Similarly, the chain length may be shortened by use of poisons such as butene-1, propylene, etc. which do not enter substantially into the polymerization. A third method of shortening chain length is accomplished by polymerizing the olefinic mixture to high conversion. The reduction in chain length by the use of each of these methods or any combination thereof will tend to reduce the gel formation resulting from the combined effect of the chain length and the cross-linking agent. Increasing the ratio of the conjugated multiolefin to that of isobutylene will also tend to reduce gel formation as is shown in the accompanying figure. In the laboratory, particularly with batch polymerizations, it is preferable to use the "poison" method of control because large quantities of diluent reduce the quantity of polymer produced per run. However, in continuous operation, molecular weight control is best obtained by the use of diluent and by control of the conversion. In either case, the method of molecular weight control is not important to the final results in determining the effect of the amount of cross-linking agent.

In measuring the extrusion rate, a small or laboratory type extruder consisting of a power-driven worm operating within a corrugated casing with a die at the outlet end is used, and the rate in inches per minute at which the polymer can be forced through the die without the production of irregular or erratic product is measured. The extruder usually has a steam-jacketed barrel and the extrusion may be conducted at temperatures ranging from 200° F. to 280° F., the preferred temperature being 237° F. The number of inches of tube which can be extruded in one minute is then measured and this measurement is an excellent indication of the rate at which the polymer can be extruded in plant practice. It should be noted that the extrusion properties of the modified copolymers of this invention are particularly good, the value for the copolymer prepared from a feed containing about 8% divinyl benzene approaching the extrusion rate for the control copolymer prepared from a feed having no divinyl benzene present, although the presence of modifiers of this type usually gives the effect of greatly reduced extrusion rate.

The amount of "swell" is determined by measurement of the gram weight per inch of a tube extruded through a standard die. The standard die has an 0.4" diameter opening and an 0.3" diameter core so as to give an extruded tube of 0.4" outside diameter and an 0.3" inside diameter and a value of 1.03 grams per inch if no "swell" occurred. The weight of 1" of the tube extruded from this die is the "swell." Although the amount of "swell" increases somewhat when the cross-linking agent is used, the polymers are quite acceptable in this respect. It should be noted that here again the physical properties as represented by the "swell" rate improve as the percentage of divinyl benzene is increased in the feed. Although it would be expected that the extrusion properties and swell properties would become increasingly worse they do in fact improve with increasing concentrations of the divinyl aromatic cross-linking agents.

In the example shown below all of the parts and percentages are by weight unless otherwise stated.

EXAMPLE

A series of batch polymerizations were conducted in which the feed mixtures contained 97 parts of isobutylene and about 3 parts of isoprene together with percentages of divinyl benzene ranging from 4 to 8% by weight based on the amount of isobutylene present. These batches were cooled by a liquid ethylene cooling jacket to approximately —103° C. (the temperature tends to range between —95° C. and —103° C.) and there was added to the mixtures approximately 3 volumes of methyl chloride. When the mixtures had been fully cooled to the desired temperature, they were polymerized by the addition of appropriate amounts of a catalyst solution containing about 0.20 gram of aluminum chloride dissolved in methyl chloride. The amount used can be easily ascertained by reference to the catalyst efficiency and the percentage conversion of the feed mixtures as shown in Table I. After the polymerization steps were completed, the mixtures were discharged into warm water to volatilize out the methyl chloride and the unpolymerized unsaturates, and the polymers were then brought up to room temperature, dried, compounded and then extruded in the standard extruder to determine the extrusion rate and swell of the modified copolymers. A control was also prepared in which the isobutylene and isoprene were copolymerized without the presence of any divinyl benzene. Table I below shows the conditions of the series of polymerizations. Table II indicates some evaluations of the corresponding vulcanizates. The raw gum polymers were cured at 320° F. using the following recipe:

| | Parts by weight |
|---|---|
| Copolymer | 100 |
| Gastex carbon black | 50 |
| Zinc oxide | 5 |
| Sulfur | 2 |
| Tetramethylthiuram disulfide | 1 |
| Mercaptobenzothiazole | 0.5 | strength of the polymer varies directly with the concentration of the cross-linking agent. The stock strength of the copolymer product from the feed containing about 4% divinyl benzene is higher than that of natural rubber. It is generally a criterion of the spliceability of the stock.

These divinyl benzene modified copolymers thus show excellent extrudability and also exhibit less tendency toward cold flow than even natural rubber.

What is claimed is:

1. In the process of making vulcanizable rubbery polymers of increased toughness and good extrusion properties, composed of a major proportion of an isoolefin having 4 to 5 carbon atoms, a minor proportion of a conjugated diolefin of 4 to 8 carbon atoms, and a minor proportion of a divinyl aromatic hydrocarbon, by polymerization at a temperature below −40° C. with a Friedel-Crafts catalyst dissolved in a solvent which does not form a complex therewith and which is liquid at the polymerization temperature, the step comprises using in the polymerization feed mixture an amount of said divinyl aromatic hydrocarbon within the range of more than 4% and up to about 10% by weight of the isoolefin.

2. A vulcanizable, rubbery polymer prepared by the process of claim 1.

3. In the process of making vulcanizable rubbery polymers of increased toughness and high gel content, composed of a major proportion of isobutylene, a minor proportion of a conjugated diolefin of 4 to 8 carbon atoms, and a minor proportion of divinyl benzene, by polymerization at a temperature below −40° C. with a Friedel-Crafts catalyst dissolved in a solvent which does not form a complex therewith and which is liquid at the polymerization temperature, the step which comprises using in the polymerization feed mix-

Table I

| Run No. | Feed | | Cat. Eff. | Per Cent Conv. | Mooney Viscosity 1½-8′ | Parts Carbon Black | Extrusion | | |
|---|---|---|---|---|---|---|---|---|---|
| | Per Cent DVB | Per Cent Butene-1 | | | | | Rate, in./min. | Swell, g./in. | App.[2] |
| 1-a | 4 | 17 | 73 | 29 | 40–37 | 10 | 24 | 2.5 | v. r. |
| 1-b | 4 | 17 | 210 | 79 | | 50 | 31.5 | 2.57 | r. |
| 1-c | 4 | 17 | 178 | 80 | | | | | |
| 1-d | 4 | 17 | 161 | 63 | | | | | |
| 1-e | 4 | 17 | 202 | 70 | | | | | |
| 2-a | 6 | 17 | 78 | 37 | 39–35 | 10 | 37 | 2.4 | r. |
| 2-b | 6 | 17 | 90 | 57 | | 50 | 40.5 | 2.3 | inter. |
| 2-c | 6 | 17 | 150 | 80 | | | | | |
| 2-d | 6 | 17 | 125 | 66 | | | | | |
| 3-a | 8 | 17 | 82 | 51 | 49–42 | 10 | 54 | 2.04 | inter. |
| 3-b | 8 | 17 | 165 | 80 | | 50 | 58 | 1.91 | s. |
| 3-c | 8 | 17 | 74 | 33 | | | | | |
| 3-d | 8 | 17 | 91 | 44 | | | | | |
| 3-e | 8 | 17 | 95 | 45 | | | | | |
| Control[1] | | | | | 49–45 | 50 | 61.2 | 1.84 | inter. |

[1] No divinyl benzene in feed.
[2] r.=rough; inter.=intermediate; s.=smooth.

Table II

| Run No. | Tensile | | | Elongation | | | 300% Modulus | | |
|---|---|---|---|---|---|---|---|---|---|
| | 4′ | 8′ | 16′ | 4′ | 8′ | 16′ | 4′ | 8′ | 16′ |
| 1-b | 345 | 480 | 530 | 750 | 540 | 360 | 60 | 140 | 330 |
| 1-c | 720 | 1,200 | 1,470 | 410 | 400 | 320 | 550 | 940 | 1,400 |
| 2-b | 390 | | 530 | 620 | | 340 | 110 | | 400 |
| 2-c | 760 | 1,100 | 1,215 | 400 | 300 | 260 | 540 | 1,015 | |
| 3-b | 320 | 450 | 430 | 460 | 360 | 260 | 160 | 280 | |
| 3-c | 730 | 1,000 | 1,190 | 320 | 250 | 190 | | | |
| Control[1] | 1,700 | 1,720 | 1,510 | 890 | 700 | 480 | 300 | 550 | 960 |

[1] No divinyl benzene in feed.

The extrudability of the modified polymers with regard to both the rate of extrusion and swell is equivalent to that of the unmodified copolymers at about 4% to 5% of divinyl benzene and is actually superior at values of 5% and above.

The unrecoverable flow varies inversely with the concentration of divinyl benzene. At four per cent divinyl benzene, approximately 95% of the total deformation is recoverable. The stock ture an amount of divinyl benzene within the range of more than 4% and up to about 10% by weight of the isobutylene.

4. A vulcanizable rubbery polymer prepared by the process of claim 3.

5. The process comprising copolymerizing 70 to 99.5% by weight of isobutylene together with 0.5 to 30% by weight of a conjugated diolefin of 4 to 8 carbon atoms, and an amount of a divinyl aromatic hydrocarbon within the range between more than 4% up to about 10% by weight based on the isobutylene, at a temperature between 0° C. and —164° C., by the addition of a Friedel-Crafts catalyst dissolved in a solvent which does not form a complex therewith and which is liquid at the polymerization temperature, and in the presence of an inert diluent, whereby a tough tripolymer having a high extrusion rate is obtained.

6. A vulcanizable rubbery tripolymer prepared by the process of claim 5.

7. The process of claim 5 in which the conjugated diolefin is butadiene.

8. The process of claim 5 in which the conjugated diolefin is isoprene.

9. The process comprising copolymerizing a major proportion of isobutylene with a minor proportion of isoprene, and more than 4% up to about 10% by weight of divinyl benzene, based on the amount of isobutylene, at a temperature between 0° C. and —164° C. in the presence of a catalyst consisting of aluminum chloride dissolved in an alkyl halide of 1-2 carbon atoms, and in the presence of at least 1 volume of inert diluent per volume of mixed olefin reactants.

10. The process comprising copolymerizing about 97% by weight of isobutylene together with about 3% by weight of isoprene, and about 6% by weight, based on the isobutylene, of divinyl benzene, at a temperature of approximately —103° C., with a catalyst solution comprising aluminum chloride dissolved in methyl chloride, in the presence of about 3 volumes of methyl chloride.

11. A rubbery product consisting of an interpolymer prepared by copolymerizing a mixture of unsaturates containing 70 to 99.5% by weight of isobutylene together with 0.5 to 30% by weight of a conjugated diolefin of 4 to 8 carbon atoms, and an amount of a divinyl aromatic hydrocarbon compound of more than 4% up to about 10% by weight, the percentages of minor constituents being based on the amount of isobutylene used, said copolymer having good extrusion properties.

12. A rubbery product such as that described in claim 11 in which the conjugated diolefin is isoprene.

13. A rubbery product such as that described in claim 11 in which the conjugated diolefin is butadiene.

EDWARD A. McCRACKEN.
ALLEN L. CHANEY.

References Cited in the file of this patent
UNITED STATES PATENTS

| Number | Name | Date |
| --- | --- | --- |
| 2,474,807 | Schoene | July 5, 1949 |